No. 776,606. PATENTED DEC. 6, 1904.
G. A. MERCER, Jr.
HOOK AND EYE.
APPLICATION FILED JUNE 23, 1904.
NO MODEL.
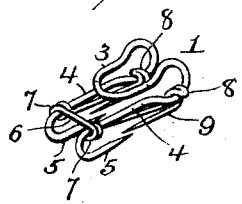
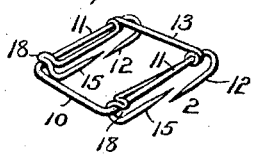
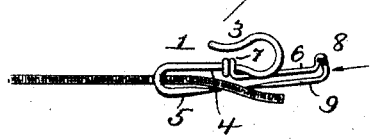
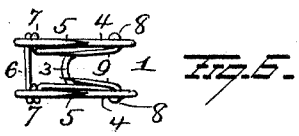
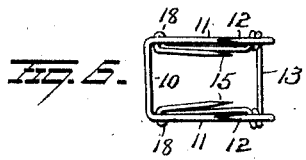
WITNESSES
E. D. Nottingham
G. F. Downing
INVENTOR
G. A. Mercer, Jr.
By H. A. Seymour
Attorney No. 776,606. Patented December 6, 1904.

UNITED STATES PATENT OFFICE.

GEORGE ANDERSON MERCER, JR., OF SAVANNAH, GEORGIA.

HOOK AND EYE.

SPECIFICATION forming part of Letters Patent No. 776,606, dated December 6, 1904.

Application filed June 23, 1904. Serial No. 213,825. (No model.)

*To all whom it may concern:*

Be it known that I, GEORGE ANDERSON MERCER, Jr., a resident of Savannah, in the county of Chatham and State of Georgia, have invented certain new and useful Improvements in Hooks and Eyes; and I do hereby declare the following to be a full, clear, and exact description of the invention, such as will enable others skilled in the art to which it appertains to make and use the same.

My invention relates to improvements in hooks and eyes, and more particularly to improved means for securing them to a garment without stitching, the object of the invention being to provide an improved hook and eye which can be easily and quickly secured to a garment and removed therefrom at pleasure; and the invention consists in certain novel features of construction and combinations and arrangements of parts, as will be more fully hereinafter described, and pointed out in the claims.

In the accompanying drawings, Figure 1 is a view in perspective of the hook. Fig. 2 is a similar view of the eye. Fig. 3 is a side edge view of the hook. Fig. 4 is a side edge view of the eye, and Figs. 5 and 6 are bottom plan views of the hook and eye.

1 represents my improved hook, and 2 the eye. The hook 1 comprises a wire bent between its ends, forming enlarged loops terminating in the hook 3. The ends of the wire then extend rearwardly, forming parallel wires 4, the ends of which are sharpened and bent back to form prongs 5, adapted to be projected through the material of the garment. On the parallel wires 4 a wire frame 6 is mounted to slide and comprises a wire bent or coiled at two points on opposite sides of its center and around the parallel wires 4, as shown at 7, and the ends of the wire extend along beside the wires 4 and are bent, forming hooks 8 to engage the bend of wires 4 where the hook 3 is formed, and the extreme ends of the frame-wires are bent back, forming prongs 9, sharpened to readily enter the garment.

To fasten the hook in position, the hooks 8 of frame 6 are disengaged from hook 3 and the frame 6 moved forward on wires 4. The prongs 5 are then projected through the fabric of the garment and frame 6 moved along wires 4, projecting its prongs 9 through the fabric, and the hooks 8 of frame 6 will spring into locked engagement with hook 3 and secure the parts in such position.

The eye 2 comprises a wire bent at two points at opposite sides of its center, forming cross-wire 10 to receive hook 3, and parallel wires 11 extend at right angles to cross-wire 10, the ends of said wires 11 being bent back and sharpened, forming prongs 12. On wires 11 a frame 13, similar to frame 6, is mounted to slide, and the hooks 18 of said frame 13 are adapted to engage the wires 11 at the ends of cross-wire 10 to secure its prongs 15 in the garment.

With my improvements it will be observed that the prongs of the hook and eye and the prongs of the frames thereon project in opposite directions toward each other and effectually secure the devices to the garment without the assistance of any additional securing means, thereby rendering them to be easily and quickly applied or removed should it be desired to wash the garment or to place the hooks and eyes on another garment.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a hook and eye, of fixed prongs thereon to engage a garment, and frames embracing portions of the hook and eye and mounted to slide on said hook and eye, said frames having prongs projecting in an opposite direction to the fixed prongs.

2. The combination with a hook and eye, of fixed prongs thereon to engage a garment, sliding frames on the hook and eye, and prongs on said sliding frames, said frames constructed to lock with the hook and eye when the prongs are in locked engagement with the garment.

3. The combination with a hook and eye, of fixed prongs at one end of the hook and on one end of the eye projecting toward the center thereof, frames embracing portions of the hook and eye and movable on said hook and said eye, and prongs on each sliding frame projecting toward the center thereof.

4. The combination with a hook and eye composed of wires and having fixed prongs at one end, wire frames mounted to slide on the wires of the hook and eye and prongs on said sliding frames projecting in a direction opposite to the disposition of the fixed prongs.

5. The combination with a hook and eye composed of wires bent into proper form and having fixed prongs at one end, of wire frames mounted to slide on the hook and eye, prongs carried by said frames, and hooks formed on the frames to lock with the hook and eye and hold the sliding frames in position with the prongs engaging the fabric of the garment on which they are used.

In testimony whereof I have signed this specification in the presence of two subscribing witnesses.

GEORGE ANDERSON MERCER, JR.

Witnesses:
A. A. SOLOMONS, Jr.,
A. F. IRBY.